United States Patent [19]

Inoue

[11] Patent Number: 4,646,088
[45] Date of Patent: Feb. 24, 1987

[54] MAGNETIC ENCODER SYSTEM
[75] Inventor: Kiyoshi Inoue, Tokyo, Japan
[73] Assignee: Inoue-Japax Research Incorporated, Japan
[21] Appl. No.: 509,258
[22] Filed: Jun. 29, 1983
[30] Foreign Application Priority Data Jul. 5, 1982 [JP] Japan ................................ 57-115355

[51] Int. Cl.[4] .......................... G08B 21/00; G01P 3/44
[52] U.S. Cl. ................................ 340/870.31; 324/207
[58] Field of Search ............................ 324/207, 208; 340/870.31, 870.32, 671; 347 P

[56] References Cited

U.S. PATENT DOCUMENTS

| 3,099,830 | 7/1963 | Wayman | 340/870.32 |
|---|---|---|---|
| 3,237,189 | 2/1966 | Wayman | 340/870.32 |
| 3,293,636 | 12/1966 | Dunne | 340/870.32 |
| 3,855,525 | 12/1974 | Bernin | 340/870.32 |
| 4,224,604 | 9/1980 | Angst | 340/347 P |
| 4,257,040 | 3/1981 | Shirasaki | 340/870.31 |

FOREIGN PATENT DOCUMENTS

| 977411 | 12/1964 | United Kingdom . |
|---|---|---|
| 1063675 | 3/1967 | United Kingdom . |
| 1309066 | 3/1973 | United Kingdom . |
| 1516684 | 7/1978 | United Kingdom . |
| 1549204 | 7/1979 | United Kingdom . |

Primary Examiner—John W. Caldwell, Sr.
Assistant Examiner—Michael F. Heim
Attorney, Agent, or Firm—Karl F. Ross; Herbert Dubno

[57] ABSTRACT

A magnetic encoder system comprising a rotary disk formed thereon with a succession of discrete magnetic encoding units each of which consists of a pair of opposed magnetic poles (N, S) and extends in alignment with a radial direction of the rotary disk. These magnetic encoding units are formed successively adjacent to the periphery of the disk and have alternating magnetic polarities. A magnetic sensing head is disposed substantially coplanar with the rotary disk and juxtaposed with the periphery of the disk across a small magnetic gap spacing.

7 Claims, 5 Drawing Figures

MAGNETIC ENCODER SYSTEM

FIELD OF THE INVENTION

The present invention relates to a magnetic encoder system and, more particularly, to a rotary encoder system of magnetic type comprising a rotary disk formed with a succession of discrete magnetic encoding or scaling units and a magnetic sensing head juxtaposed with the rotating disk for successively sensing the scaling units to measure an angular displacement thereof.

BACKGROUND OF THE INVENTION

A magnetic rotary encoder system has been known to be a highly useful instrument to measure an angular or linear movement of a movable member such as in a machine tool. Indeed, precision measurement of such a movement can be basis for accurately positioning a movable part, e.g. a tool or workpiece, in machine and other tools.

In these systems of conventional type, magnetic disks have a common scaling configuration in which the successive magnetic scaling units are arranged along a circle on one surface of the disk coaxial therewith so that the opposed magnetic poles constituting each of the scaling units extends in alignment with the rotary direction of the disk. The magnetic sensing head is disposed in spaced juxtaposition with that one surface such as to succcessively sense these scaling units which are swept along that circle as the disk is rotated. It is recognized that this magnetic disk structure is characterized by a relatively poor density of magnetic encoding or scaling units per area (angle) and hence an unsatisfactory resolving power for magnetic sensing.

Rotary magnetic disks of the other known type make use of a scale arrangement in which the disk is magnetized across the thickness thereof so that magnetic scaling units, each of which extends perpendicularly to the side surfaces of the disk, are successively formed in a mutually parallel relationship along a circular zone coaxial with the disk. The magnetic sensing head is then C- or U-shaped to place between its two sensing arms the rotating disk. Such a disk must have a considerable thickness to present magnetic fluxes of a satisfactory strength from each of the scaling units. Thickening the disk entails an increase in its weight and it has been found that this may impose an undue load on the sensing movement of a member moving to rotate the disk.

In both types of conventional magnetic encoder systems described, it should also be noted that a thin rotating disk tends to undulate and the undulating movement of the rotating disk is accentuated towards the periphery thereof adjacent to which the magnetic scale units are arranged. As a result, the rotating disk and the sensing head which are spaced apart across a small air gap may come into a sliding contact, causing an undesirable wear of the head surface. Furthermore, a considerable change in the magnetic gap spacing is created and tends to result in a sensing error.

OBJECTS OF THE INVENTION

The present invention therefore seeks to provide a new and improved magnetic encoder system of a rotary type which can circumvent the disadvantages encountered in the prior art and has extremely high sensing precision.

SUMMARY OF THE INVENTION

According to the present invention there is provided, in a first aspect thereof, a magnetic encoder system which comprises a rotary disk formed with a succession of discrete magnetic encoding or scaling units and a magnetic sensing head juxtaposed with the disk for successively sensing the scaling units as the disk is rotated to measure and encode an angular displacement thereof, wherein each of the magnetic scaling units is elongated, and consists of a pair of opposed magnetic poles (N, S) oriented, in a radial direction of the rotary disk. Advantageously, the magnetic scaling units each individually extending in the radial direction are arranged in succession along an annular zone adjacent to the periphery of the disk. The magnetic sensing head is disposed substantially coplanar with the rotary disk and is spacedly juxtaposed with the periphery of the disk across a uniform gap spacing whose width is radial.

BRIEF DESCRIPTION OF THE DRAWING

These and other features of the present invention as well as advantages thereof will become more readily apparent from a reading of the following description when taken with reference to the accompanying drawing in which.

SPECIFIC DESCRIPTION

Figure 1:
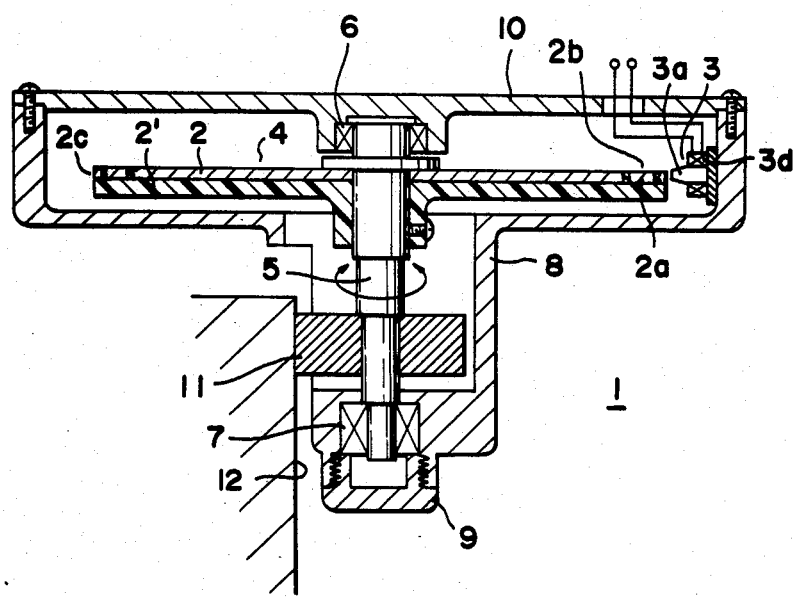
FIG. 1 is a sectional view diagrammatically illustrating a magnetic rotary encoder system according to the present invention.

Referring now to FIG. 1, the magnetic encoder system 1 shown comprises a magnetic disk 2 and a sensing head 3. The magnetic disk 2 is securely attached to a support disk 2', composed, e.g. of a plastic, to form a rotary member 4. The support disk 2' is here optional and may be employed if the disk 2 is as thin as 1 mm or less to hold it sufficiently rigid when rotated. The rotary member 4, here the support disk 2' supporting the magnetic disk 2 thereon, is securely carried on a rotary shaft 5 which is journaled between a pair of bearings 6 and 7. The bearing 7 is retained in a frame member 8 by means of a bolt 9, and the bearing 6 is retained in a cover plate 10 secured to the frame member 8 by means of bolts as shown. The rotary shaft 5 carries a wheel member 11 securely thereon with which a moving part or surface 12 is drivingly coupled to rotate the rotary member 4 and hence the magnetic disk 2 so that a movement of the surface 12 may be measured as a corresponding angular displacement of the magnetic disk 2. The magnetic sensing head 3 is juxtaposed across a magnetic gap with the periphery of the disk 2. The disk 2 is magnetized in a radial direction thereof.

Figure 4:
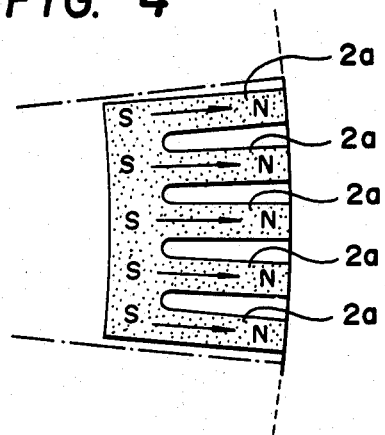
FIG. 4 is a diagrammatic plan view illustrating a portion of the magnetic scaling units arranged in an alternative form.
Figure 2:
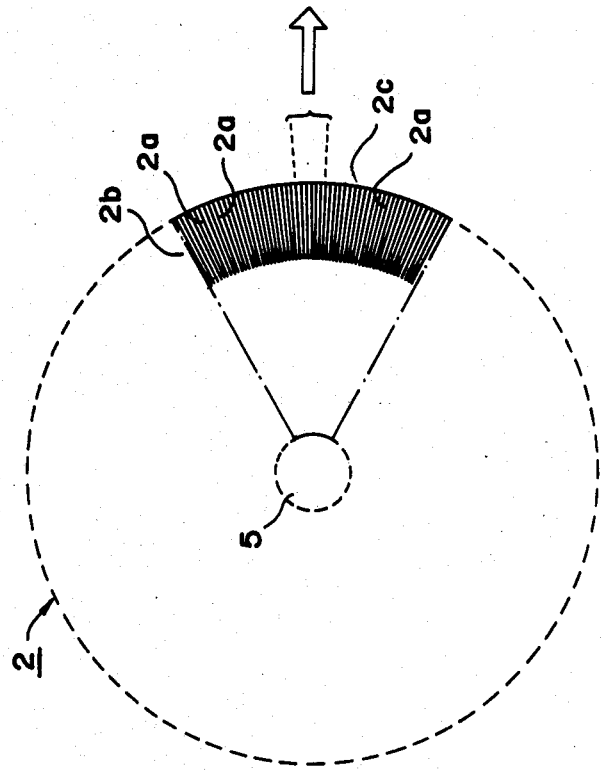
FIG. 2 is a plan view diagrammatically illustrating an arrangement of magnetic scaling units or markings in a magnetic disk according to the present invention.

More specifically, the disk 2 is here shown formed with magnetic scaling or encoding units or markings 2a, which can be discrete radially elongated magnets, successively along an annular zone 2b adjacent to the periphery 2c of the disk 2, with which the sensing head 3 is juxtaposed. As is also apparent from FIG. 1 the lengths (radially) of the discrete N - S scaling units 2a is greater than the thickness of the flat disk in which they are formed. Each of the units 2a, according to the invention, is elongated across the zone 2b, and consists of a pair of opposed magnetic poles, N and S, which are in alignment with a radial direction of the disk 2 as more clearly seen from FIGS. 2 and 3. The annular zone across which each of the units 2a extends in a radial direction of the disk 2 has a uniform width d. Adjacent scaling units or markings 2a are uniformly spaced apart and, in the embodiment illustrated in FIG. 3, alternate in their magnetic polarities so that the N and S poles alternately appear along the periphery 2c of the disk 2. In the embodiment of FIG. 4, adjacent scaling units or markings 2a are the same in their magnetic polarities and are shown to present their N poles which are spaced apart with each other along the periphery 2c of the disk 2 and rooted in their common S pole in the radial directions. Furthermore, in the embodiment of FIG. 3, the adjacent magnetic markings 3a can be interconnected at their ends inner towards the center of the disk 2.

The disk 2 can be magnetized in a manner as will be described to form thereon magnetic scaling or encoding units or markings 2a as described. In this connection, the disk 2 for magnetization can be a layer of magnetic powder, e.g. of a ferrite, painted or otherwise attached on the support disk 2', or on a thin film of a non-magnetic material such as a synthetic resin which can then be attached on the support disk 2'. Instead of such a continuous layer, discrete, fine strip layers corresponding to the markings 2a in size may be formed on a thin synthetic-resin carrier film or the support disk 2' and may then be magnetized to provide these markings or units 2a. Alternatively, the disk 2 can quite advantageously be a disk homogeneously composed of a magnetic material (e.g. an iron-chromium base spinodal decomposition type magnetic alloy) and having a uniform thickness of 0.5 to 3 mm and may be attached on the support disk 2'. A thin, uniform layer or body of a magnetic power or material may also be formed and attached selectively on the annular zone 2b of the carrier film or the support disk 2'.

Figure 3:
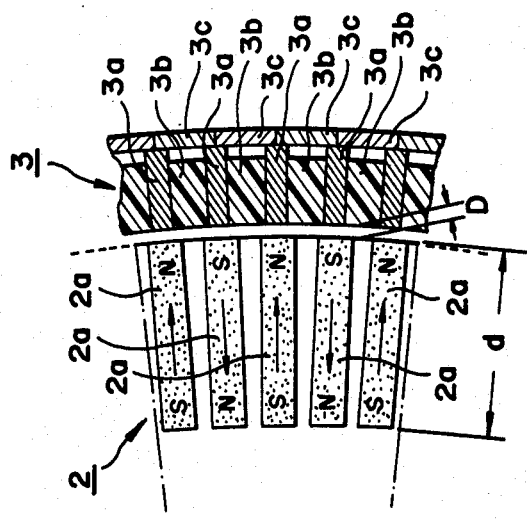
FIG. 3 is an enlarged view diagrammatically illustrating a portion of the magnetic scaling units of FIG. 2 arranged in one form, together with a portion of a sensing head in an encoder system according to the invention.

The magnetic sensing head 3 may comprise a single unitary magnetic core (FIG. 1) but, preferably, a plurality of core pieces of a magnetic material 3a separated by a spacer of a non-magnetic material 3b and interconnected by a yoke 3c as shown in FIG. 3. A sensing coil 3d is wound on the core or magnetic pieces (FIG. 1) and may be connected via an amplifier and a waveform-shaping circuit to a counter and processing circuit (not shown) in a conventional arrangement. The head 3 is disposed so as to be coplanar with the disk 2 and radially juxtaposed with the periphery thereof across a radial magnetic gap D in a sensing relationship with the magnetic encoding units 2a. In the embodiment of FIG. 3, the pitch of the core pieces 3a corresponds to the pitch of the encoding units 2a. The elements 3c can be Hall-effect elements, magnetic resistance elements, or like magnetic sensing elements.

In the unique construction of the magnetic disk 2 according to the present invention in which each of magnetic encoding or scaling units 2a which are successively formed along a rotary direction of the disk in a zone adjacent to the periphery 2c thereof is made in alignment with a radial direction thereof, it is appreciated that there is a marked increase in the intensity of encoding outputs due to an increased interpole distance in each scaling unit 2a. Furthermore, the density of scaling units 2a per rotary angle of the disk 2 can be maximized, thus permitting encoding outputs to develop with an extremely high resolving power. Still further, it is made possible, as illustrated, to dispose the sensing head 3 substantially coplanar with the rotary disk 2 in a closely spaced juxtaposition with the periphery 2c thereof. As a result, any possible undulating movement which may be produced in the rotating disk 2 causes no material change in the magnetic spacing D. This enables the spacing D to be minimized, on one hand without a fear of any possible sliding contact of the rotating disk 2 with the sensing head and any consequential wear thereof and on the other hand without developing a sensing error and with the result of maximized encoding outputs.

Figure 5:
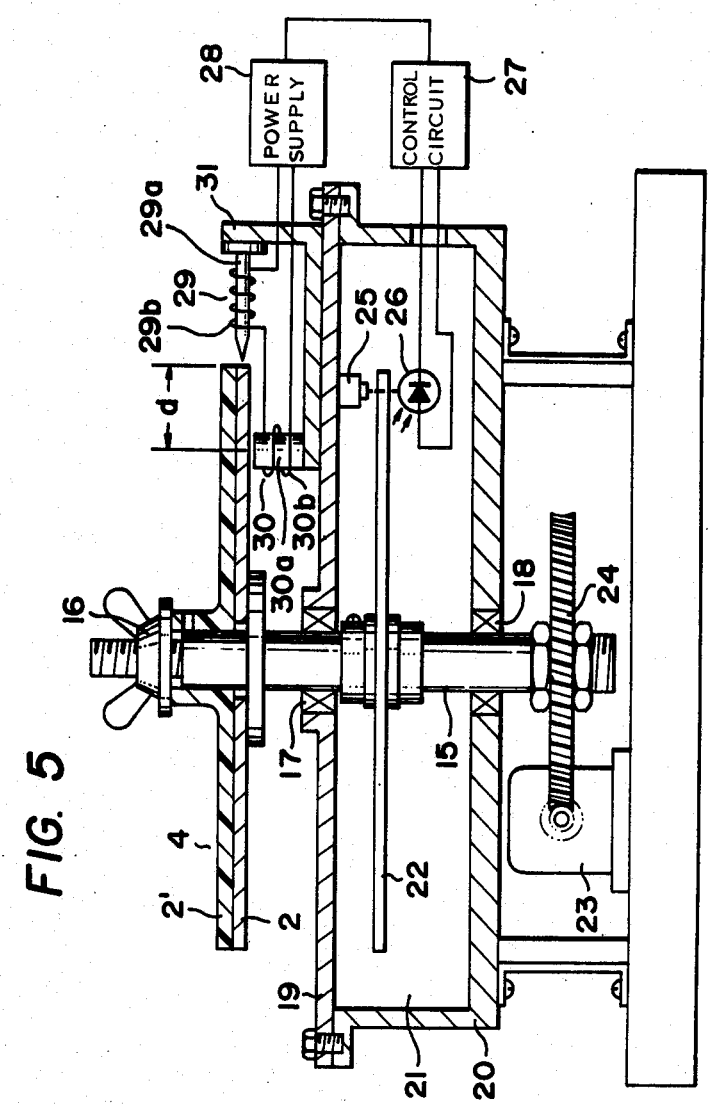
FIG. 5 is a view basically in section diagrammatically illustrating a method of forming the magnetic scaling units in a rotary disk according to the invention.

FIG. 5 shows an arrangement for forming encoding scaling units 2a in a rotary disk to prepare the magnetic disk 2 according to the invention. In this arrangement, a rotary member 4 constituted by the disk 2 and the support disk 2' attached thereto is carried on a rotary shaft 15 and fixed in position thereon by means of a butterfly nut 16. The rotary shaft 15 is journaled on a pair of bearings 17 and 18 which are retained respectively in a cover plate 19 and a frame member 20 which are secured together by means of bolts and forming a compartment 21. The rotary shaft 15 also carries thereon an original disk 22 which is rotatable in the compartment 21. The shaft 15 is drivingly coupled with a motor 23 via a gear transmission 24 to rotate the original disk 22 and the rotary member 4.

The original disk 22 is here made of a glass or like transparent disk having along a peripheral zone thereon non-transparent markings formed, e.g. by photo-etching, in a pattern corresponding to that of magnetic encoding units 2a to be formed on corresponding peripheral zone 2b of the magnetic disk 2. A light source 25 is disposed in one side of the rotary original disk 22 to pass through the peripheral zone a light beam which is intercepted by a photo-diode 26 disposed in the opposite side of the rotary disk 25. The photo-diode 26 is connected to a control circuit 27 designed to act on a power supply 28 for energizing a pair of magnetizing heads 29 and 30.

The magnetizing head 29 is constituted by a core member 29a and a magnetizing coil 29b wound thereon. The magnetizing head 30 is constituted by a core member 30a and a magnetizing coil 30b wound thereon. The coils 29b and 30b are connected in series with each other to the magnetizing power supply 28. The core members 29a and 30a are preferably interconnected by a yoke 31 of a high-permeability material to minimize a leakage of magnetic fluxes produced therethrough when the coils 29b and 30b are energized. The core member 29a disposed coplanar with the disk 2 in a closely spaced juxtaposition with the periphery 2c thereof may be a single core which is pointed or tapered towards the periphery 2c but preferably is a composite core having a structure which is substantially the same as that of the sensing head 3 shown in FIG. 3. Preferably, such a core member is tapered towards the end thereof forming the magnetic gap D with the rotary disk 2. The core member 30a may be columnar in shape having an end face of a diameter corresponding to the width of each of the encoding units 2a to be formed on the disk 2 and positioned in a closely spaced juxtaposition with one side surface of the disk 2 at a distance d from the periphery 2c thereof.

In the magnetizing operation, the rotary member 4 and the original disk 22 secured on the rotary shaft 15 are rotated by the motor 24. The light beam from the source 25 passing photo-diode 26 is successively interrupted by a series of non-transparent markings formed on the rotating disk 22. Thus, a series of interruption signals is developed in the circuit 27 responsive to the photo-diode 26 and selectively actuates the power supply 28. The heads 29 and 30 are intermittently energized to form a succession of magnetic encoding scales on the rotary disk 2. The original disk 22 need not be of the same diameter as that of the magnetic disk 2 and should rather preferably be larger in diameter than the disk 2 for the sake of increasing the magnetic marking accuracy A succession of magnetic markings or encoding units 2a with alternating polarities as shown in FIG. 3 can be formed on the disk 2 by causing the power supply 28 to alternate its magnetizing output polarities.

What is claimed is:

1. A magnetic encoder system comprising:
    a substantially flat rotary disk, said disk having formed thereon a succession of radially elongated discrete magnetic encoding units, each of said radially elongated discrete magnetic encoding units consisting of a discrete pair of radially separated opposed magnetic poles (N,S), said units having radial lengths greater than the thickness of said disk; and
    a magnetic sensing head juxtaposed with said disk for successively sensing said encoding units as the disk is rotated to measure an angular displacement thereof, such of said encoding units, with said opposed magnetic poles extending substantially in alignment with a radial direction of said disk.

2. The magnetic encoder system defined in claim 1 wherein said disk has at least one layer of magnetic material having a selectively treated zone which provides said succession of radially elongated discrete magnetic encoding units.

3. The system defined in claim 1 or claim 2 wherein said magnetic encoding units are formed on said disk successively in a direction of rotation thereof.

4. The system defined in claim 1 or claim 2 wherein said magnetic encoding units are formed on said disk successively in an annular zone coaxial therewith and adjacent to the periphery thereof.

5. The system defined in claim 4 wherein said successive magnetic encoding units are magnetized to present alternating magnetic poles along said periphery of the disk.

6. The system defined in claim 5 wherein said sensing head is disposed substantially coplanar with said disk and spacedly juxtaposed with said periphery across a gap spacing.

7. The system defined in claim 1 wherein said disk is a foil mounted upon a thicker annular support member journaled for rotation about an axis of said disk and coextensive therewith, said sensing head having a sensing element juxtaposed with the outer peripheral edge of said disk and substantially of a thickness corresponding thereto.

* * * * *